Patented July 21, 1953

2,646,446

UNITED STATES PATENT OFFICE 2,646,446

PRODUCTION OF SALIGENIN DERIVATIVES

Edgar C. Britton and James D. Head, Midland, Mich., assignors to The Dow Chemical Company, Midland, Mich., a corporation of Delaware No Drawing. Application December 23, 1949, Serial No. 134,835

5 Claims. (Cl. 260—479)

This invention relates to the production of saligenin derivatives, and, more particularly, to the production of compounds represented by the general formula

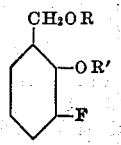

in which each of the radicals R and R' is of the class consisting of hydrogen and acetyl (i. e., 3-fluorosaligenin, 3-fluorosaligenin monoacetates and 3-fluorosaligenin diacetate).

It has been known that halogens can be removed from a benzene ring by the action of hydrogen in the presence of certain catalysts. It has also been known that alcohol groups or ester groups can be reduced by the action of hydrogen in the presence of certain catalysts. However, so far as we are aware, it has not heretofore been known to be possible to remove selectively only one of two different halogens attached to a benzene ring, i. e., to remove a chloro radical and leave a fluoro radical attached to the ring. Neither has it been known to be possible to effect dechlorination by the aforementioned method without simultaneously reducing an alcohol or ester group attached to the same benzene nucleus as the chloro group. By the present invention it is possible to conduct a catalytic dehalogenation to remove the chloro group from 5-chloro-3-fluorosaligenin or from 5-chloro-3-fluorosaligenin diacetate, without removing the fluoro group, and without reducing the OH group or an ester group.

According to the invention a saligenin derivative having the general formula

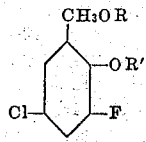

in which each of the radicals R and R' is of the class consisting of hydrogen and acetyl is dechlorinated by the action of one mol of gaseous hydrogen per mol of the saligenin derivative. The dechlorination is accomplished at a hydrogen pressure of from about 10 to about 40 pounds per square inch gauge and in the presence of a palladium catalyst and an acceptor for the hydrogen ions formed by the dechlorination. Such an acceptor is a compound that reacts with the hydrogen ions to form a substance having an ionization constant not greater than $3\times10^{-4}$ (i. e., a substance that forms a one normal solution having a pH higher than about 3.5).

The method of the invention is limited to the dechlorination of 5-chloro-3-fluorosaligenin, of 5-chloro-3-fluorosaligenin diacetate and of a 5-chloro-3-fluorosaligenin monoacetate. Products which result from the dechlorination are 3-fluorosaligenin, 3-fluorosaligenin diacetate and 3-fluorosaligenin monoaceaates. The 3-fluorosaligenin, the 3-fluorosaligenin diacetate and 3-fluorosaligenin monoacetates are materials having particular utility because any of them can be used as an intermediate for the production of 3-fluorosalicylaldehyde, which is a valuable compound for use in the preparation of oxygen-carrying chelates (see J. Am. Chem. Soc. 68, page 2254).

The dechlorination is carried out in a hydrogen atmosphere. It has been found that the dechlorination proceeds when the hydrogen pressure is as low as about 10 pounds per square inch gauge, but it is usually preferred that the hydrogen pressure be at least about 20 pounds per square inch gauge. It is essential that the hydrogen pressure not exceed 40 pounds per square inch gauge because undesirable side reactions proceed when a higher pressure is used. It is usually preferred that the pressure be not higher than about 30 pounds per square inch gauge. The reaction is continued until one mol of hydrogen has reacted per mol of the chlorinated saligenin derivative (e. g., until the pressure drop indicates reaction to such an extent).

It is believed that palladium itself is the catalyst for the dehalogenation reaction. However, because of the high cost of palladium it is ordinarily desired that the palladium be supplied in the form of a coating on some carrier. Palladium is readily available on barium sulfate, calcium carbonate or carbon, as carriers, calcium carbonate being preferred as a carrier because it tends itself to prevent undue acidity in the mixture to be dechlorinated, carbon being preferred because such a catalyst is most easily available. Powdered palladium itself can be used as a catalyst, but is not employed, usually, because of its high cost. The amount of catalyst that is ordinarily used is from about 0.1 to about 2 per cent. (The term "per cent" and "parts" are used herein to refer to per cent and parts by weight, unless otherwise indicated.) It is usually preferred to use from about 0.25 per cent to about 0.5 per cent of the catalyst, based on the palladium actually present.

The hydrogen ion acceptor that is used in the practice of the invention can be any material that reacts with hydrogen ions to form a substance having an ionization constant not greater than about $3 \times 10^{-4}$; preferably the ionization constant is not greater than about $3 \times 10^{-5}$. For example, sodium acetate, which reacts with hydrogen ions to form acetic acid, can be used as the hydrogen ion acceptor. Similarly, any inorganic base, or any organic base can be used as the hydrogen ion acceptor. It is usually preferred that the acceptor be water soluble, and that a water solution be used. However, the reaction can be conducted in a non-aqueous organic solution that comprises a hydrogen ion acceptor. Ordinarily, the reaction is run batchwise, and it is preferred to employ about one mol of the hydrogen ion acceptor per mol of the saligenin derivative; this is the amount of the hydrogen ion acceptor actually required to neutralize the hydrogen produced. However, a substantial excess (e. g., from two to three times the theoretical amount) may be employed; likewise the reaction proceeds with a deficiency, but only partial conversion is possible.

The following examples illustrate the new process, but are not to be construed as limiting the scope of the invention.

*Example 1*

3-fluorosaligenin was produced according to the following procedure:

Aqueous sodium hydroxide (400 cc. of 1 normal caustic), 5 - chloro - 3 - fluorosaligenin [1] (35.3 grams) and palladium on a charcoal carrier (3 grams of a composition comprising 5 per cent of palladium) were placed in a flask and subjected to a hydrogen atmosphere at a total pressure of 30 pounds per square inch gauge. The flask was then placed on a commercial shaker and shaken for about 30 minutes (until a pressure drop of about 15.5 pounds per square inch indicated the reaction of about 0.2 mol of hydrogen). The catalyst was separated from the liquid by filtration, and the filtrate was acidified by hydrochloric acid (50 cc. of a 30 per cent solution). The acidified liquid was saturated with sodium chloride; the crystals of 3-fluorosaligenin precipitated and were separated by filtration. These crystals were dissolved in acetone (200 cc.), and salt was separated from the acetone solution by filtration. The filtrate was placed in an evaporating dish and the acetone was allowed to evaporate leaving the dry 3-fluorosaligenin (18 grams). This corresponds to a 64 per cent yield of the desired product.

[1] Note: The preparation of 5-chloro-3-fluorosaligenin is disclosed in the application of Edgar C. Britton and James D. Head entitled "Production of 3-fluorosalicylaldehyde," filed concurrently herewith, now U. S. Patent 2,576,064.

*Example 2*

A new compound (4-chloro-alpha-dimethyl-amino-6-fluoro-o-cresol) was prepared as an intermediate needed in the practice of the invention according to the following procedure:

4-chloro-2-fluorophenol (1042 grams) and di-methyl amine (2615 grams of a 25 per cent aqueous solution) were added to a flask and the mixture was cooled to 30° C. Aqueous formaldehyde (a total of 628 grams of a 40 per cent aqueous solution) was added stepwise with stirring to this mixture. The formaldehyde was added at such a rate that the temperature of the mixture did not rise above 45° C. When the addition of formaldehyde was complete, the mixture was stirred thoroughly and was heated on a steam bath at about 80° C. for 18 hours. The liquid in the flask was then cooled and the oily product which had separated was solidified by the addition of a few crystals of 4-chloro-alpha-dimethyl amino-6-fluoro-o-cresol. The solid product (4-chloro-alpha-dimethylamino-6-fluoro - o - cresol) which formed was broken and separated from the liquid by filtration; the filtrate was then cooled to 15° C. and further product which precipitated was separated by filtration and added to the original precipitate. The filtrate was then concentrated to about 700 cc. and additional 4-chloro-alpha-dimethylamino-6-fluoro-o-cresol was recovered by a steam distillation. The total recovery of the desired 4-chloro-alpha-dimethyl-amino-6-fluoro-o-cresol amounted to 1376 grams which corresponds to a 95 per cent yield based on the 4-chloro-2-fluorophenol charged. The 4-chloro-alpha-dimethylamino-6-fluoro-o-cresol ($C_9H_{11}ClFNO$;

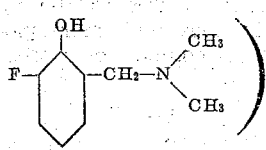

is believed to be a new compound; its melting point is 100° C. to 102° C.

A new compound (5-chloro-3-fluorosaligenin diacetate) was prepared as a starting material for use in the practice of the invention according to the following procedure:

A sample of the 4-chloro-alpha-dimethyl-amino-6-fluoro-o-cresol produced as described in the preceding paragraph (345 grams) and acetic anhydride (800 cc.) were refluxed for 16 hours. Fractional distillation of the resulting product through an 18 inch column resulted in the isolation of 5-chloro-3-fluorosaligenin diacetate (360 grams), which corresponds to a yield of 82 per cent based upon the 4-chloro-alpha-dimethyl-amino-6-fluoro-o-cresol used. 5-chloro-3-fluorosaligenin diacetate ($C_{11}H_{10}ClFO_4$;

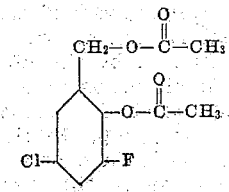

boiling point 134° C. to 136° C. at an absolute pressure of 4 mm. of mercury) is believed to be a new compound.

3-fluorosaligenin diacetate was produced according to the following procedure:

A sample of 5-chloro-3-fluorosaligenin diacetate (26 grams) was mixed with methanol (150 cc.); palladium on a charcoal carrier (2 grams of a composition comprising 5 per cent of palladium) and sodium acetate (15 grams) were added to the mixture which was then subjected to a hydrogen atmosphere (40 pounds per square inch gauge). The flask was then shaken on a mechanical shaker for about 30 minutes (until a pressure drop of 10 pounds per square inch indicated the reaction of about 0.15 mol of hydrogen); the catalyst was removed from the solution by filtration; and the solvent was evaporated by a reduced pressure distillation in the course of which the temperature was maintained below 80° C. The residue from this reduced pressure distillation was identified as 3-fluorosaligenin diacetate.

We claim:
1. A method of producing a compound having the general formula

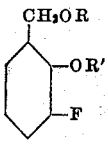

in which each of the radicals R and R' is of the class consisting of hydrogen and acetyl which method comprises dechlorinating a saligenin derivative having the general formula

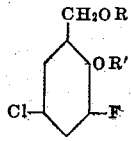

in which R and R' have the meanings hereinbefore set forth, by the action of one mol of gaseous hydrogen per mol of the saligenin derivative at a pressure of from about 10 to about 40 pounds per square inch gauge, and in the presence of a palladium catalyst and a hydrogen ion acceptor.

2. A method as claimed in claim 1 in which each of the radicals R and R' is acetyl.

3. A method as claimed in claim 2 in which the hydrogen pressure is not greater than 30 pounds per square inch gauge.

4. A method as claimed in claim 1 in which each of the radicals R and R' is hydrogen.

5. A method as claimed in claim 4 in which the hydrogen pressure is not greater than 30 pounds per square inch gauge.

EDGAR C. BRITTON.
JAMES D. HEAD.

References Cited in the file of this patent

Remick, Electronic Interpretation of Organic Chem. (1949), pp. 357–359.

Kelber, "Berichte der deut. Chem. Gesell.," vol. 50, pp. 305–310 (1917).